United States Patent [19]

Hirata et al.

[11] Patent Number: 4,690,965

[45] Date of Patent: Sep. 1, 1987

[54] RUBBER COMPOSITIONS HAVING IMPROVED REINFORCING PROPERTIES AND LOW HEAT BUILD-UP

[75] Inventors: Yasushi Hirata, Sayama; Hitoshi Kondo, Higashimurayama; Goro Yokoyama, Tokyo; Masaki Ohara, Wako, all of Japan

[73] Assignee: Bridgestone Corporation, Tokyo, Japan

[21] Appl. No.: 858,985

[22] Filed: May 2, 1986

[30] Foreign Application Priority Data

May 2, 1985 [JP] Japan ................................. 60-93569

[51] Int. Cl.$^4$ ............................................. C08K 5/32
[52] U.S. Cl. ........................................................ 524/236
[58] Field of Search ............................... 524/259, 236

[56] References Cited

U.S. PATENT DOCUMENTS

| | | | |
|---|---|---|---|
| 2,315,855 | 4/1943 | Howland | 525/333.1 |
| 2,315,856 | 4/1943 | Howland | 525/333.1 |
| 3,842,034 | 10/1974 | Fujimori et al. | 524/87 |
| 3,925,590 | 12/1975 | Hausch et al. | 428/423.3 |
| 4,376,189 | 3/1983 | Trivette | 525/291 |
| 4,387,756 | 6/1983 | Ogawa et al. | 526/340 |
| 4,387,757 | 6/1983 | Ogawa et al. | 526/340 |
| 4,410,656 | 10/1983 | Coran et al. | 525/301 |
| 4,433,094 | 2/1984 | Ogawa et al. | 526/340 |
| 4,433,114 | 2/1984 | Coran et al. | 525/332.7 |
| 4,434,266 | 2/1984 | Trivette, Jr. | 524/451 |

FOREIGN PATENT DOCUMENTS

| | | | |
|---|---|---|---|
| 1946332 | 10/1970 | Fed. Rep. of Germany | 524/259 |
| 1185896 | 3/1970 | United Kingdom . | |

*Primary Examiner*—Joseph L. Schofer
*Assistant Examiner*—N. Sarofim
*Attorney, Agent, or Firm*—Sughrue, Mion, Zinn, Macpeak & Seas

[57] ABSTRACT

A rubber composition having improved reinforcing properties and low heat build-up is disclosed, which comprises 20–150 parts by weight of carbon black having IA of not less than 60 mg/g and DPB of not less than 75 ml/100 g and 0.1–3 parts by weight of at least one of p-nitroso-N-methylaniline, p-nitroso-N-ethylaniline and p-nitroso-N-propylaniline, based on 100 parts by weight of rubber.

2 Claims, No Drawings

RUBBER COMPOSITIONS HAVING IMPROVED REINFORCING PROPERTIES AND LOW HEAT BUILD-UP

BACKGROUND OF THE INVENTION

1. Field of the Invention

This invention relates to rubber compositions, and more particularly to a rubber composition having improved reinforcing properties and a low heat build-up.

2. Related Art Statement

In order to meet a social request for saving resources and energy, in a field of rubber industries, particularly tire industry, there has actively been developed pneumatic tires having a low fuel consumption in the last few years. A rubber composition having a low heat build-up is essential to the development of such tires having a low fuel consumption. Particularly, for example, in tires for passenger cars, there is a method of using styrene-butadiene copolymer rubbers (SBR) having the controlled contents of bound styrene and vinyl bond in butadiene unit as described in Japanese Patent laid open Nos. 57-51,503, 57-55,204 and 58-36,705. However, it was entirely impossible to apply this method to rubbers other than SBR, particularly natural rubber which is most widely used in heavy load tires.

On the other hand, in Japanese Patent Application Publication No. 50-38,131, British Pat. No. 1,185,896, U.S. Pat. Nos. 2,315,855 and 2,315,856, and the like, it is known that the heat build-up of rubber compositions is improved by adding nitrosoquinolines, nitrosoanilines and the like thereto. However, these nitroso-compounds surely improve the heat build-up, but have particularly such a drawback that when they are applied to polyisoprene rubbers, the peptizing effect of polymer is large, which considerably degrades reinforcing properties of rubber composition, such as wear resistance and the like.

In the prior art, it was insufficient to satisfy both performances of the reinforcing properties such as wear resistance and the like, and the low heat build-up in the rubber composition composed mainly of natural rubber.

SUMMARY OF THE INVENTION

The inventors have made various investigations in order to solve the above problems and as a result the invention has been accomplished.

The invention is based on a discovery that the amount of carbon gel is increased by using a particular nitrosoaniline together with a particular carbon black, whereby it is possible to supplement the reduction of the reinforcing properties due to the peptizing effect of polymer through nitrosoaniline, and the heat build-up is considerably improved. In this case, the carbon gel means a reaction product of polymer with carbon black, and the larger the gel amount, the better the wear resistance.

According to the invention, there is the provision of a rubber composition comprising 20-150 parts by weight of carbon black having an iodine adsorption value (IA) of not less than 60 mg/g and dibutyl phthalate oil absorption (DBP) of not less than 75 ml/100 g and 0.1-3 parts by weight of at least one nitrosoaniline compound selected from the group consisting of p-nitroso-N-methylaniline, p-nitroso-N-ethylaniline and p-nitroso-N-propylaniline, based on 100 parts by weight of natural rubber and/or synthetic diene rubber.

DETAILED DESCRIPTION OF THE INVENTION

As the rubber to be used in the invention, mention may be made of natural rubber, synthetic polyisoprene rubber, styrene-butadiene copolymer rubber, polybutadiene rubber, butyl rubber and blends thereof.

According to the invention, the carbon black is necessary to have IA of not less than 60 $m^2/g$, preferably not less than 80 $m^2/g$ and DBP of not less than 75 ml/100 g, an example of which includes SAF, ISAF, HS-ISAF, LS-ISAF, LM-ISAF, HAF, LS-HAF, HS-HAF, LI-HAF, N-339, N-351, N-362 and the like. Carbon blacks having IA and DBP outside the above ranges or so-called low reinforcing-carbon blacks having IA of less than 60 $m^2/g$ and/or DBP of less than 75 ml/100 g are unfavorable because they are small in the interaction to the nitrosoaniline compound as mentioned later, and the effect of improving heat build-up is small and the improving effect of reinforcing properties can not be expected.

The nitrosoaniline compound to be used in the invention includes p-nitroso-N-methylaniline, p-nitroso-N-ethylaniline and p-nitroso-N-propylaniline. The use of the nitrosoaniline compound other than the above compounds are unfavorable because they have no effect on the increase of the carbon gel even when using together with the carbon black. According to the invention, the amount of the nitrosoaniline compound used is 0.1-3 parts by weight. When the amount is less than 0.1 part by weight, the improving effect of heat build-up is insufficient, while when it exceeds 3 parts by weight, the peptizing effect of polymer becomes larger and the reinforcing properties are unfavorably lowered.

In addition to the above carbon black and nitrosoaniline compound, if necessary, the rubber composition according to the invention may properly be compounded with various additives usually used in rubber industry, such as softening agent, antioxidant, vulcanization accelerator, accelerator activator, vulcanizing agent and the like.

As mentioned above in detail, in the rubber composition according to the invention, the heat build-up is considerably improved without lowering the wear resistance of the rubber composition composed mainly of natural rubber. This effect is also clarified from the following examples.

The following examples are given in the illustration of the invention and are not intended as limitations thereof.

EXAMPLES 1-3, COMPARATIVE EXAMPLES 1-7

Rubber compositions having a compounding recipe (parts by weight) as shown in the following Table 1 were prepared by kneading in a Banbury mixer, and then the amount of carbon gel, the rebound resilience and the wear resistance as a measure of reinforcing properties were evaluated. In this case, each of nitrosoaniline compounds and the like was compounded in an amount corresponding to $5.75 \times 10^{-3}$ mole. The results are also shown in Table 1. Moreover, the method of evaluation is shown as follows.

Amount of carbon gel: The unvulcanized rubber composition was immersed in a solvent of THF (tetrahydrofuran) for 48 hours, after which the amount of carbon gel was measured as % by weight.

Rebound resilience: The measurement was made according to JIS K6301.

Wear resistance: Each of the rubber compositions shown in Table 1 was used in a tread portion of a radial tire for truck and bus having a size of 1000 R20. After the tire was run over 50,000 km, the depth of the remaining groove was measured, from which a running distance required for wear of 1 mm was calculated. The running distance was represented by an index on a basis that Comparative Example 1 is 100. The larger the index value, the better the wear resistance.

TABLE 1

| | Comparative Examples | | | | | | | Examples | | | |
|---|---|---|---|---|---|---|---|---|---|---|---|
| | 1 | 2 | 3 | 4 | 5 | 6 | 7 | 1 | 2 | 3 | 4 |
| Natural rubber | 100 | 100 | 100 | 100 | 100 | 100 | 100 | 100 | 100 | 100 | 100 |
| Carbon black ISAF*[1] | 50 | 50 | 50 | 50 | 50 | 50 | 50 | 50 | 50 | 50 | 50 |
| Stearic acid | 3 | 3 | 3 | 3 | 3 | 3 | 3 | 3 | 3 | 3 | 3 |
| Nocrac 6C*[2] | 1 | 1 | 1 | 1 | 1 | 1 | 1 | 1 | 1 | 1 | 1 |
| Zinc white | 5 | 5 | 5 | 5 | 5 | 5 | 5 | 5 | 5 | 5 | 5 |
| Nocceler MSA-G*[3] | 0.5 | 0.5 | 0.5 | 0.5 | 0.5 | 0.5 | 0.5 | 0.5 | 0.5 | 0.5 | 0.5 |
| Sulfur | 2.5 | 2.5 | 2.5 | 2.5 | 2.5 | 2.5 | 2.5 | 2.5 | 2.5 | 2.5 | 2.5 |
| p-nitroso-N—phenylaniline | | 1.14 | | | | | | | | | |
| p-nitroso-N—isopropylaniline | | | 0.94 | | | | | | | | |
| p-nitroso-N—cyclohexylaniline | | | | 1.17 | | | | | | | |
| p-nitroso-N,N—dimethylaniline | | | | | 0.86 | | | | | | |
| p-nitroso-N,N—diethylaniline | | | | | | 1.02 | | | | | |
| 5-nitroso-8-hydroxyaniline | | | | | | | 1.0 | | | | |
| p-nitroso-N—methylaniline | | | | | | | | 0.78 | | | 2.34 |
| p-nitroso-N—ethylaniline | | | | | | | | | 0.86 | | |
| p-nitroso-N—n-propylaniline | | | | | | | | | | 0.94 | |
| Amount of carbon gel (% by weight) | 36.1 | 33.1 | 32.0 | 25.5 | 34.4 | 33.6 | 32.8 | 50.6 | 49.5 | 46.9 | 57.9 |
| Rebound resilience (%) | 59.0 | 66.4 | 65.3 | 64.8 | 63.8 | 63.0 | 64.6 | 65.9 | 65.2 | 64.9 | 68.7 |
| Wear resistance (index) | 100 | 89 | 87 | 86 | 90 | 89 | 92 | 103 | 102 | 100 | 99 |

*[1]IA = 121 mg/g, DBP = 114 ml/100 g
*[2],*[3]made by Ohuchi Shinko Kagaku Kogyo K.K.

As apparent from Talbe 1, in the rubber compositions according to the invention, the heat build-up is excellent and the wear resistance is improved in accordance with the increase of the carbon gel amount.

EXAMPLES 4–6, COMPARATIVE EXAMPLES 8–14

Rubber compositions having a compounding recipe (parts by weight) as shown in the following Table 2 were prepared to evaluate the amount of carbon gel and the rebound resilience in the same manner as in Example 1. The results are shown in Table 2.

As apparent from Table 2, according to the invention, the amount of carbon gel is increased by using the carbon black together with the nitrosoaniline compound.

TABLE 2

| | Comparative Examples | | | | | Examples | | | Comparative Examples | |
|---|---|---|---|---|---|---|---|---|---|---|
| | 8 | 9 | 10 | 11 | 12 | 4 | 5 | 6 | 13 | 14 |
| Natural rubber | 100 | 100 | 100 | 100 | 100 | 100 | 100 | 100 | 100 | 100 |
| Carbon black SAF*[1] | 50 | | | | | 50 | | | | |
| Carbon black HAF*[2] | | 50 | | | | | 50 | | | |
| Carbon black N-362*[3] | | | 50 | | | | | 50 | | |
| Carbon black FEF*[4] | | | | 50 | | | | | 50 | |
| Carbon black LS-HAF*[5] | | | | | 50 | | | | | 50 |
| Stearic acid | 3 | 3 | 3 | 3 | 3 | 3 | 3 | 3 | 3 | 3 |
| Nocrac 6C | 1 | 1 | 1 | 1 | 1 | 1 | 1 | 1 | 1 | 1 |
| Zinc white | 5 | 5 | 5 | 5 | 5 | 5 | 5 | 5 | 5 | 5 |
| Nocceler MSA-G | 0.5 | 0.5 | 0.5 | 0.5 | 0.5 | 0.5 | 0.5 | 0.5 | 0.5 | 0.5 |
| Sulfur | 2.5 | 2.5 | 2.5 | 2.5 | 2.5 | 2.5 | 2.5 | 2.5 | 2.5 | 2.5 |
| p-nitroso-N—methylaniline | | | | | | 0.78 | 0.78 | 0.78 | 0.78 | 0.78 |
| Amount of carbon gel (% by weight) | 39.9 | 30.5 | 31.9 | 23.9 | 26.0 | 59.8 | 39.4 | 42.1 | 23.5 | 26.5 |
| Rebound resilience (%) | 57.9 | 63.3 | 63.1 | 72.2 | 58.7 | 63.7 | 69.6 | 69.4 | 74.3 | 61.6 |

*[1]IA = 145 mg/g, DBP = 113 ml/100 g,
*[2]IA = 82 mg/g, DBP = 102 ml/100 g,
*[3]IA = 118 mg/g, DBP = 78 ml/100 g,
*[4]IA = 43 mg/g, DBP = 121 ml/100 g,
*[5]IA = 82 mg/g, DBP = 71 ml/100 g.

What is claimed is:

1. A rubber composition having improved reinforcing properties, comprising 20–150 parts by weight of carbon black having an iodine adsorption value (IA) of not less than 60 mg/g and dibutyl phthalate oil absorption (DBP) of not less than 75 ml/100 g and 0.1–3 parts by weight of at least one nitrosoaniline compound selected from the group consisting of p-nitroso-N-methylaniline, p-nitroso-N-ethylaniline and p-nitroso-N-propylaniline, based on 100 parts by weight of natural rubber and/or synthetic diene rubber.

2. The rubber composition according to claim 1, wherein said carbon black has IA of not less than 80 $m^2/g$ and DBP of not less than 75 ml/100 g.

* * * * *